Aug. 14, 1923.
A. F. CASE
1,464,747
STORAGE AND RECLAIMING PLANT
Filed Dec. 22, 1919  2 Sheets-Sheet 1
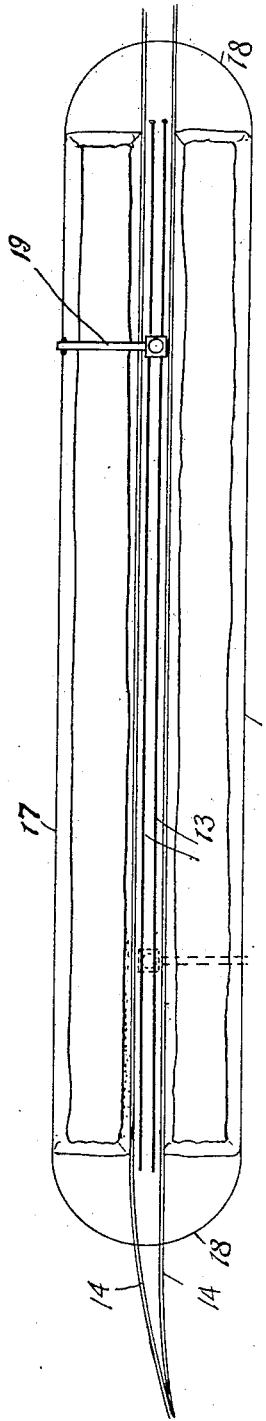
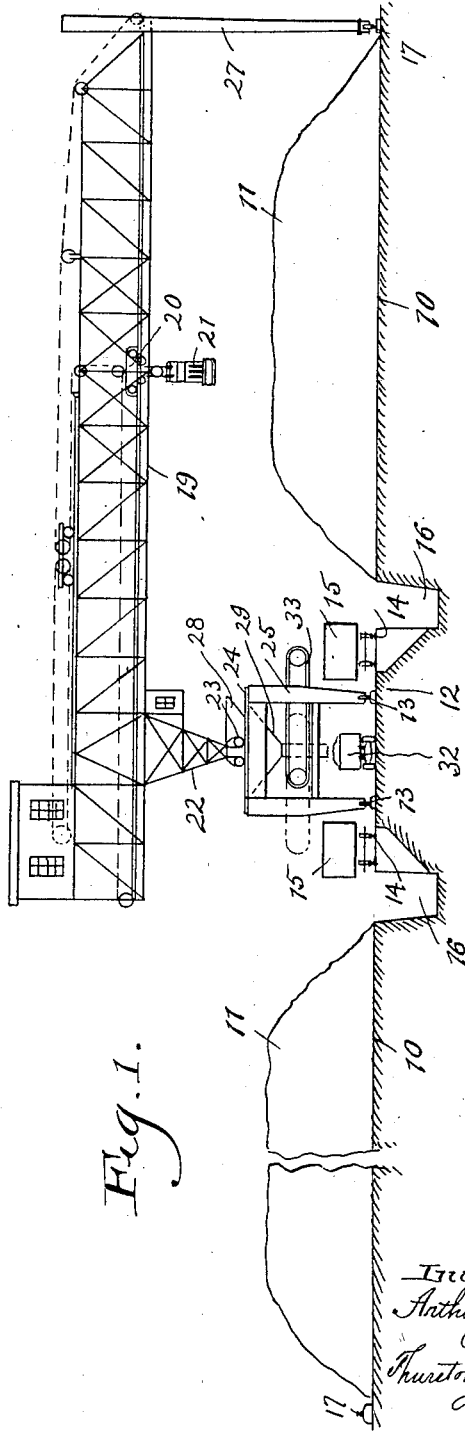
Inventor
Arthur F. Case
By
Thurston Kwon + Hudson
attys.

Aug. 14, 1923.                                              1,464,747
                          A. F. CASE
                  STORAGE AND RECLAIMING PLANT
              Filed Dec. 22, 1919       2 Sheets-Sheet 2
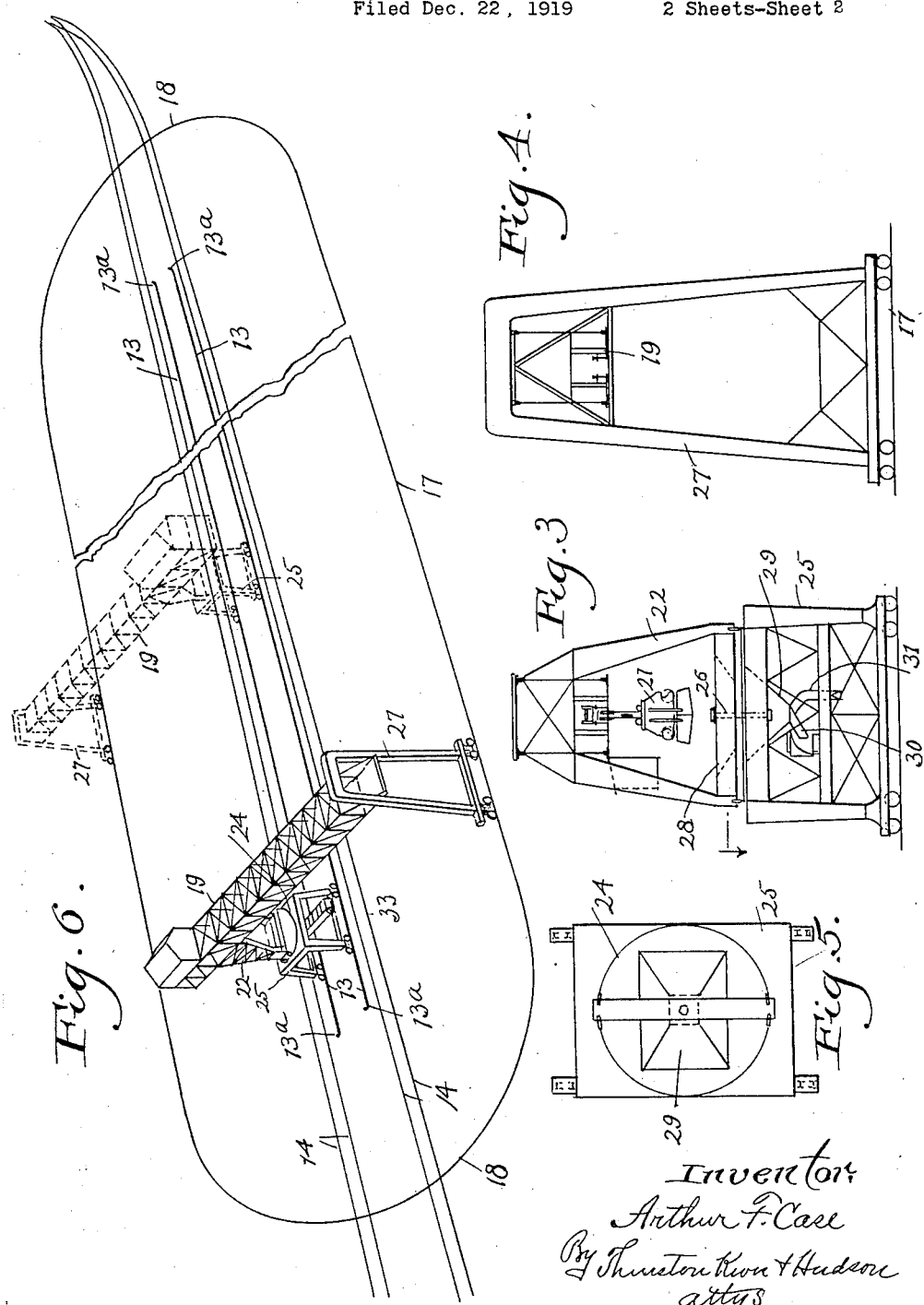

Patented Aug. 14, 1923.

1,464,747

UNITED STATES PATENT OFFICE.

ARTHUR F. CASE, OF CLEVELAND, OHIO, ASSIGNOR TO THE WELLMAN-SEAVER-MORGAN COMPANY, OF CLEVELAND, OHIO, A CORPORATION OF OHIO.

STORAGE AND RECLAIMING PLANT.

Application filed December 22, 1919. Serial No. 346,573.

*To all whom it may concern:*

Be it known that I, ARTHUR F. CASE, a citizen of the United States, residing at Cleveland, in the county of Cuyahoga and State of Ohio, have invented a certain new and useful Improvement in Storage and Reclaiming Plants, of which the following is a full, clear, and exact description.

This invention relates to a storage and reclaiming plant for coal and the like, of the type having a traveling bridge adapted to move over the storage space, and provided with a trolley with a bucket or equivalent device for depositing the material in the storage yard, or for reclaiming it.

The principal object of this invention is to provide a plant of this type, so constructed that twice the storage capacity is provided for a given length of bridge than with similar plants used heretofore assuming equal length of storage area.

Further the invention aims to provide a plant of this character, which for a given storage area permits the use of a much shorter and lighter bridge than heretofore required, thereby effecting a saving in initial cost of the bridge and the cost of runways and runway foundations, as well as operating mechanism, all of which result in a reduction in the cost per ton for handling the material stored and reclaimed.

In brief, it is the aim of the invention, therefore, to provide a storage and reclaiming plant having large capacity and economical in cost of construction and in operation.

The above and other objects are attained by my invention which contemplates two storage areas, side by side, and a bridge of a length such as to span one of the storage areas, but capable of being moved about so as to span and travel lengthwise over both storage spaces or areas.

In the preferred embodiment of my invention, the storage areas are on both sides of a central space constituting the runway for one end of the bridge, and runways for cars which bring for storage, or carry away from storage, the coal or the like being handled, one end of the bridge being preferably supported on a gantry frame on the central runway, while the opposite end of the bridge is preferably supported by a shear leg adapted to travel over either of two parallel portions of an outer track or runway paralleling the outer boundaries of the two storage spaces and connected by a semi-circular track at one or each end of the plant. Different instrumentalities may be provided for turning the bridge from one storage area to the other, but I prefer to accomplish this by supporting the inner end of the bridge on wheels or rollers on a circular track on the gantry, whose axis is concentric with the semi-circular portion of the outer runway when the gantry is at one end of its travel.

The above and other novel features constitute my invention which may be here briefly summarized as consisting in certain novel combinations and arrangements of parts which will be described in the specification and set forth in the appended claims.

In the accompanying sheets of drawings, Fig. 1 is a vertical, sectional view through the storage plant, showing the bridge in elevation; Fig. 2 is a plan view of the same on a reduced scale; Fig. 3 is an end view of the bridge looking toward its inner end, or toward the central supporting gantry; Fig. 4 is an end view looking toward the shear leg at the outer end of the bridge; Fig. 5 is a plan view of the top of the gantry showing the circular track on which the tower at the inner end of the bridge turns; and Fig. 6 is a perspective view, part being broken away, showing the bridge and the various tracks or runways, and showing the bridge in two different positions to illustrate the manner in which the bridge can be caused to span either storage space.

Referring now to the drawings, 10, 10, represent two duplicate storage areas or spaces on which material, 11, hereinafter referred to as coal, may be stored, and from which it may be reclaimed. Between the storage areas 10, 10, there is a central runway space or foundation 12. Centrally located on 12, and extending lengthwise thereof, are two spaced tracks 13, constituting a runway for the inner end of the bridge or support therefor, to be explained, and on opposite sides of the runway 13, are two tracks 14, for cars 15, which may be hopper bottom cars designed to deliver the coal for storage or to convey it away when it is being reclaimed. The cars 15 may dump the coal into pockets or continuous pits 16 along the inner boundaries of the storage areas 10, 10, or on the outer sides of the central runway space 12.

Along the outer boundaries of the storage areas 10, 10, are parallel portions 17 of a runway or track for the outer end of the bridge, which portions extend in parallel relationship to each other and to the inner runway or tracks 13 for a distance depending upon the length of the storage plant, and at one or both ends these parallel portions 17 of the outer runway are joined by a semi-circular portion 18. In Figs. 1 and 2 I have shown both ends of the parallel track sections 17 of the outer runway joined by the semi-circular sections 18, though it is not essential that the semi-circular sections 18 be at both ends of the plant. This may be advisable in some instances to decrease the distance traveled by the bridge in moving from one extreme position to the other over opposite storage areas.

The bridge which is used in storing and reclaiming the coal is shown at 19, the length of the bridge being approximately or slightly greater than the width of one storage area 10. As usual, the bridge has a trolley 20 carrying a storing and reclaiming bucket 21. At its inner end the bridge is supported by a tower 22 at the bottom of which are wheels or rollers 23 which travel on a circular track 24 of a gantry frame 25 which travels along the tracks 13 of the central runway. Additionally the bottom of the tower 22 is connected to the top of the gantry frame by a central king-bolt or pin 26 which is at the center of the circular track 24.

At its outer end the bridge is supported by a so-called shear leg 27 which may be connected to the bridge in any approved manner, and is provided at the bottom with wheels which travel on the sections 17 and 18 of the outer track or runway.

Independent means will be provided for causing the main gantry frame and the shear leg to travel along the runways provided therefor, and the propelling means will be arranged so that when the gantry frame and shear leg are traveling the parallel sections of the runways they will travel at equal speeds. At the ends of the central runway tracks 13, stops 13ª are provided, and when the wheels of the gantry frame reach these stops the driving motor or motors of the main gantry frame will be stopped. The shear leg motor or motors will then cause the shear leg to travel around the semi-circular section 18 of the outer runway until the bridge has described a complete turn of one hundred and eighty degrees, and then spans the opposite storage space to that which it formerly spanned. Thus all parts of both storage areas may be reached by causing the bridge to travel the parallel sections of the inner and outer runways and to be turned in the manner just described at one or both ends of the plant.

The parts are so arranged that when the wheels of the gantry frame engage the stops 13ª at the ends of the inner runway tracks 13, the king-pin or bolt 26 is at the center of the adjacent semi-circular track section 18, and when the bridge is being turned, the gantry frame remains stationary and the tower 22 at the inner end of the bridge rotates about the axis of the king-pin or bolt 26 and turns on the circular track of the gantry frame.

In the use of this plant, coal for storage will be brought in on the cars 15, and will be dumped into the pockets or pits 16, from which it will be taken by the bucket 21 and deposited on the storage piles.

In reclaiming the coal it will be taken up by the bucket 21, and may be discharged direct into empty cars 15, or into a hopper 28, in the bottom of the tower 22. From this hopper the coal passes by gravity into a hopper 29 carried by the gantry frame 25. This hopper 29 is provided at the bottom with what may be termed a selective gate, so arranged that the coal is discharged into either one of two chutes, 30 and 31 (see Fig. 3). The chute 31 is for loading cars or trucks such as shown at 32 in Fig. 1 between the legs of the gantry frame, the central runway space 12 being constructed so that trucks for carrying away the reclaimed coal may freely travel the runway space between the tracks 13 on which the gantry frame runs. The other chute 30, directs the coal to a horizontal scraper conveyor, shown conventionally at 33, supported on the gantry frame at right angles to the gantry runway. This scraper conveyor is capable of a limited longitudinal movement such as to bring the discharge point of the conveyor over the approximate center line of cars standing on the tracks 14, or to retract the same to a position wholly within the gantry frame, thus providing clearance for the passage of locomotives or the like along the car tracks 14. This scraper frame is movable laterally to either side of the gantry frame as indicated by the full and dotted lines of Fig. 1, and is made reversible so that it may scrape the material discharged through the chute 30 in either direction.

Thus it will be seen that coal may be rapidly unloaded for storage by causing the cars containing the same to be brought up on either or both the car tracks 14 and dumped into either or both pits 16, from which the coal may then be taken by the bucket and conveyed to any point of either storage area. In reclaiming the coal it may be taken from any point of either storage area and discharged either direct into empty cars standing on either track 14, or by depositing the coal in the hoppers it can be discharged into trucks, or by the scraper conveyor into cars on either track 14. Not only does my improved storage plant have the flexibility of use mentioned above, but it is possible to command double the storage area usually covered by a bridge of the same size and length of runways. This results in a low initial cost of the bridge. On account of using a common central runway with the bridge spanning either storage space, a great saving is effected in the first cost of these runways, and since the size of the structure is relatively small in proportion to the amount of storage area covered, the runway foundations are not required to carry excessive loads, and this also reduces the initial cost.

Still further, the structure requires smaller operating motors than one of larger proportions, and by the use of a relatively short bridge for a storage space of given total area the period of the operating cycle can be considerably reduced, permitting the use of a relatively small bucket to produce the same hourly capacity of one employed on a longer bridge. All these features affect the depreciation charges against handling costs, and reduce the cost per ton for handling the coal.

Though I have shown only the preferred construction, many of the above mentioned advantages can be attained with a plant modified as to details of construction and arrangement, but embodying the main features of the invention, and I therefore do not desire to be confined to the precise structural arrangement shown, but aim in my claims to cover all modifications which do not involve a departure from the spirit and scope of my invention in its broad aspects.

Having described my invention, I claim:

1. A storage and reclaiming plant comprising two storage areas arranged side by side, a traveling bridge adapted to span either storage area, two runways for the bridge, one located between and the other one extending along the outer boundaries of the storage areas, a trackway for cars intermediate the storage areas, and means carried by the bridge for conveying material from the intermediate space to the storage areas.

2. A storage and reclaiming plant comprising two storage areas arranged side by side, a bridge adapted to span and travel lengthwise of either storage area, runways for the bridge, one located between and the other along the outer sides of the storage areas, the outer runway having at one end of the plant a semi-circular portion, a trackway for cars, intermediate the storage areas whereby material may be delivered to or from a space between the storage areas, and means on the bridge for transferring material to and from the storage areas.

3. A storage and reclaiming plant comprising two storage areas arranged side by side, a central runway between the storage areas, a runway at the outer sides and along one end of the plant, the portion at the end being semi-circular, a traveling bridge adapted to span either storage area, and provided at its inner end with a support adapted to travel along the central runway and at its outer end with a support adapted to travel the outer runway, means whereby the bridge when at the end of the plant may be turned about the axis of the inner support through an arc of one hundred and eighty degrees, and means on the bridge for transferring material from the space between the storage areas and from the storage areas to the intermediate space.

4. A storage and reclaiming plant comprising two storage areas arranged side by side, a central runway between the storage areas, a runway at the outer sides and along one end of the plant, the portion at the end being semi-circular, a traveling bridge adapted to span either storage area, and provided at its inner end with a support adapted to travel along the central runway and at its outer end with a support adapted to travel the outer runway, said inner support having means by which the bridge may be turned about a vertical axis through an arc of one hundred and eighty degrees with reference to a part of the inner support resting on the central runway.

5. In a storage and reclaiming plant two storage areas arranged side by side and having a central portion with a bridge runway and a second runway extending about the sides and one end of the plant, a bridge adapted to travel on said runways, means whereby the bridge may be turned so as to span either storage area, and means on the bridge for transferring material from the space between the storage areas and from the storage areas to the intermediate space.

6. A plant for storing and reclaiming, comprising two storage areas arranged side by side and separated by a central space having a bridge runway and having tracks for conveying cars located on opposite sides of the bridge runway, an outer bridge runway having portions extending along the outer portions of both storage areas, said portions being parallel to the central bridge runway and having a semi-circular portion at the end of the plant, and a bridge adapted to span either storage area and having supports traversing said runways, together with means whereby the bridge may be turned through an arc of one hundred and eighty degrees around the semi-circular portion of the outer runway at the end of the plant.

7. In a storing and reclaiming plant, a pair of storage areas arranged side by side, a bridge runway between the storage areas, an outer bridge runway extending along the outer sides and about one end of the plant, a bridge adapted to span either storage area and having supports adapted to travel on said runways, the inner support comprising a gantry frame to which the bridge is swiveled.

8. In a storing and reclaiming plant, a pair of storage areas arranged side by side, a bridge runway between the storage areas, an outer bridge runway extending along the outer sides and about one end of the plant, a bridge adapted to span either storage area and having supports adapted to travel on said runways, the inner support comprising a gantry frame adapted to travel back and forth along the central runway, and a structure secured to the bridge and rotatably connected to the gantry frame to turn with the bridge about the axis of the gantry frame.

9. In a plant for storing and reclaiming material, a pair of storage areas arranged side by side and having a central space provided with a bridge runway and with a track for cars, an outer bridge runway extending along the sides and around one end of the plant, a bridge adapted to span either storage area, and having an inner support adapted to travel the central runway, and means carried by the inner bridge support for receiving reclaimed material and for discharging the same laterally into cars on said track.

10. In a plant for storing and reclaiming material, a pair of storage areas arranged side by side and having a central space, said central space being provided with a bridge runway, and with tracks on both sides thereof to accommodate cars adapted to discharge material along the inner boundaries of the two storage areas, an outer bridge runway, a traveling bridge adapted to span either storage area and having means adapted to pick up the material from the inner boundary of either storage area and deposit it at any point of the storage areas, or to reclaim material from any point of the storage areas and cause it to be discharged to a receiving member on said central space.

11. A plant for storing and reclaiming material, comprising two storage areas arranged side by side and having a middle runway space and with depressed pits between the storage areas and the runway space, said runway space accommodating one end of the bridge and delivery cars, an outer runway extending along the sides and one end of the plant, and a bridge adapted to span either runway and adapted to be turned at the end of the plant through an arc of one hundred and eighty degrees.

In testimony whereof, I hereunto affix my signature.

ARTHUR F. CASE.